United States Patent [19]

Hall

[11] 3,998,545
[45] Dec. 21, 1976

[54] ANAMORPHIC ENLARGING SYSTEM

[75] Inventor: Jon Hall, Santa Monica, Calif.

[73] Assignee: Optivision Inc., Santa Monica, Calif.

[22] Filed: Mar. 26, 1975

[21] Appl. No.: 562,259

[52] U.S. Cl. .................................. 355/52; 355/77
[51] Int. Cl.² ................ G03B 27/68; G03B 27/32
[58] Field of Search .................. 355/52, 77, 55, 56

[56] References Cited
UNITED STATES PATENTS

| | | | |
|---|---|---|---|
| 1,032,172 | 7/1912 | Zollinger | 355/52 X |
| 1,829,633 | 10/1931 | Chretien | 355/52 X |
| 1,932,082 | 10/1933 | Newcomer | 355/52 X |
| 3,644,037 | 2/1972 | Larraburu | 355/52 |
| 3,743,414 | 7/1973 | Kirchoff | 355/52 |

*Primary Examiner*—Richard A. Wintercorn
*Attorney, Agent, or Firm*—Ralph B. Pastoriza

[57] ABSTRACT

The enlarging system includes a projection housing for receiving a negative film insert device supporting an anamorphic negative film image which is projected towards a working surface. Below the insert device is a projection lens, lens adapter, anamorphic lens secured in the adapter, and a dioptor lens. A light bellows connects between the projection lens and the negative film insert device. A first adjustment is used to vary the distance of the entire projection housing and lens system towards and away from the working surface. A second adjustment, in turn, varies the distance of the lens system from the negative film insert device. The dioptor in combination with the anamorphic lens permits a selected format size for the enlarged print to be chosen, the first adjustment matching perfectly the projected image with the selected format. The second adjustment brings the image into a fine focus.

3 Claims, 5 Drawing Figures

ANAMORPHIC ENLARGING SYSTEM

This invention relates to a method and apparatus for printing enlargements from anamorphic negative film images.

BACKGROUND OF THE INVENTION

Anamorphic pictures are taken by providing an anamorphic lens on the camera. Essentially, the anamorphic lens is of cylindrical shape to result in a "squeezing" of the photographed scene in one dimension. If the axis of the cylindrical surface of the anamorphic lens is vertical, the squeeze on the negative image will be in a horizontal direction whereas if the axis of the cylindrical portion of the anamorphic lens is horizontal, the image will be squeezed in a vertical direction. After a film is developed containing anamorphic images, it can be projected on a wide angle screen by simply incorporating a similar anamorphic lens in the projection system.

There are two advantages to the foregoing systems. First, more of a scene can be captured on a given sized negative than is possible without an anamorphic lens. Second, the projected picture utilizing an anamorphic lens to unsqueeze the image provides a substantially wider view thus simulating more closely the wide angle view of a person's normal vision. Such anamorphic systems have been successful in certain commercial enterprises. An example is motion picture photography utilizing "cinemascope" lens. On the other hand, however, such anamorphic systems have not found any appreciable application among amateur photographers or the average person taking home snapshots. The major reason for this lack of use by the general public is the fact that the negative anamorphic image can really only be practically displayed with equipment presently available by projecting the image through an anamorphic lens on a large screen. Actual printing of anamorphic images in a conventional type enlarging apparatus to provide a printed picture has not been successful because of distortion.

As a consequence of the foregoing, if a person wished to provide a printed picture of a scene in a wide angle format; that is, wherein the print is perhaps three to six times as long as it is high, a fairly large film negative has been used and then the picture cropped at the top and bottom when printing the same in the conventional enlarger.

BRIEF DESCRIPTION OF THE PRESENT INVENTION

With the foregoing considerations in mind, the present invention contemplates a method and apparatus for printing pictures from anamorphic negative film images wherein any of the usual desired selected formats can be provided and wherein distortion is substantially eliminated.

Briefly, the method of the anamorphic enlarging system of the present invention includes the steps of projecting the anamorphic image of the negative film towards a flat surface through a given projection lens. An anamorphic lens corresponding to the anamorphic lens with which the picture was taken is positioned between the projection lens and the surface to unsqueeze the image. A given dioptor lens is then positioned between the anamorphic lens and the surface to provide a projected picture size on the surface corresponding to a given format. In the next step, the negative film, projection lens, anamorphic lens and dioptor lens are moved as a unit towards and away from the surface to effect exact registration of the projected picture size and the given format. Thereafter the projection lens, anamorphic lens and dioptor only are moved as a unit relative to the negative film image to effect a fine focusing of the image on the format.

Print paper is exposed in the given format to the image on the surface and then developed and printed to provide the desired enlargement.

The combination of the anamorphic lens with a properly selected dioptor enables printing of enlargements of anamorphic negative film images without distortion and in a desired format.

BRIEF DESCRIPTION OF THE DRAWINGS

A better understanding of this invention will be had by now referring to the accompanying drawings in which.

DETAILED DESCRIPTION OF THE INVENTION

Figure 1:
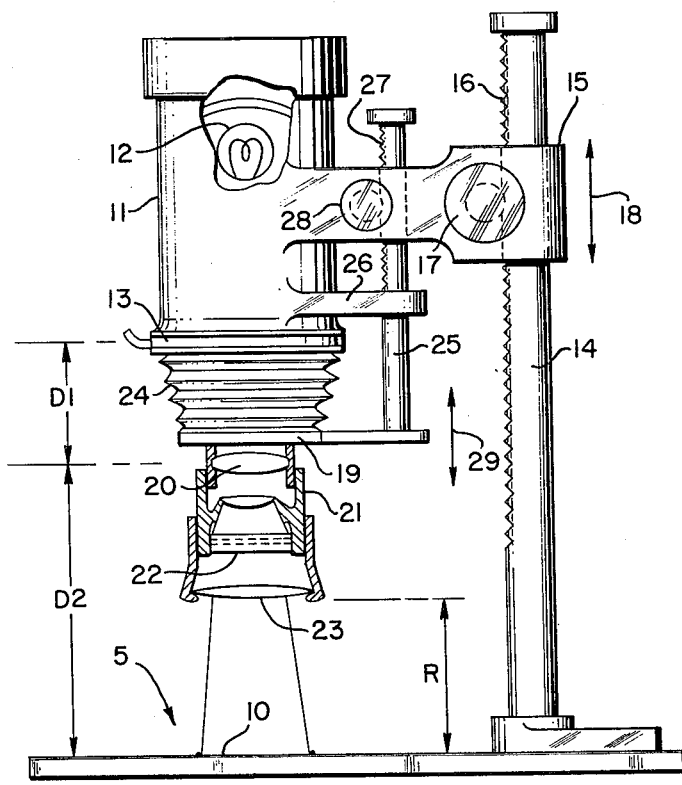
FIG. 1 is a side elevational view partly broken away of an enlarging system for anamorphic images in accord with the present invention.

Referring first to FIG. 1 there is shown a table defining a flat working surface 10 for receiving printing paper upon which an anamorphic negative film image is to be projected. Shown above the table is a projection housing 11 including a light source 12 and supporting a negative film insert device 13. A first adjusting means takes the form of a stand 14 and support arm 15 connected to the housing 11. The stand 14 includes rack teeth 16 cooperating with gear knob 17 so that by rotating the knob 17, the entire housing 11 and negative film insert device 13 can be raised and lowered to vary their distance from the work surface 10. This motion is represented by the double-headed arrow 18.

A projection lens holder 19 below the negative insert device 13 supports a projection lens schematically depicted at 20. This projection lens might be a conventional 150 mm. lens with stop and shutter control for enabling adjustment of the brightness of a projected image as well as the time duration that printing paper is to exposed to the image all as is conventional.

In accord with a feature of this invention, there is provided a lens adapter 21 supporting an anamorphic lens 22 in optical alignment with the projection lens 20. A dioptor lens 23 in turn is supported between the anamorphic lens 22 and the work surface 10 as shown.

A light bellows 24 connects between the lens holder 19 and negative film insert device 13. The lens holder 19 itself is supported to the housing 11 by a second adjustable means which takes the form of a vertical rod 25 connected at its lower ends to the lens holder 19 and passing through a guide arm 26 secured to the housing 11. The upper end portion of the rod 25 includes rack teeth 27 cooperating with a knob gear 28 on the same arm 15 supporting the knob gear 17. Rotation of the knob 28 will move the film holder 19 in an up and down direction as indicated by the double-headed arrow 29 relative to the housing 11. Thus, by this second adjusting means it is possible to vary the distance between the lens holder 19 and the negative film insert device 13, this distance being indicated D1.

Figure 2:
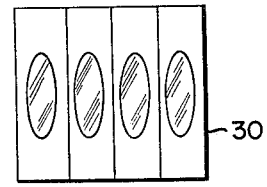
FIG. 2 shows an example of an anamorphic negative film image which has been squeezed in a horizontal direction.

Referring now to FIG. 2 there is shown an example of an anamorphic negative film image 30 which for the sake of illustration has been squeezed in a horizontal direction so that a series of side-by-side circles appear as elipses.

Figure 3:
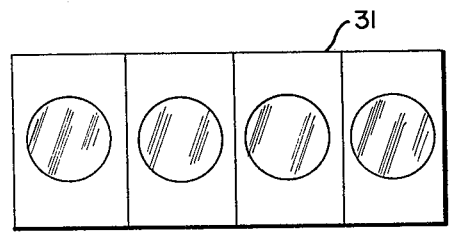
FIG. 3 shows the resulting print from the anamorphic image of FIG. 2.

FIG. 3 illustrates the resulting print by utilizing the apparatus of FIG. 1 wherein the image 30 of FIG. 2 has been unsqueezed to provide a given print of selected size in accord with a selected format. It will be noted that the print 31 illustrates the series of side-by-side circles without distortion.

Figure 4:
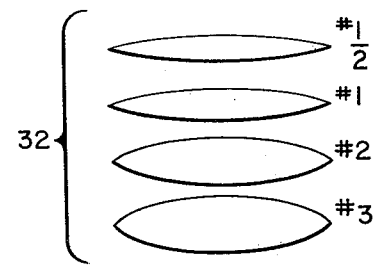
FIG. 4 illustrates a plurality of dioptor lens usable with the system of FIG. 1; and, FIG. 5 is a fragmentary plan view of the work surface of FIG. 1 looking in the direction of the arrow 5 illustrating examples of selectable formats for enlargements.

FIG. 4 shows at 32 a plurality of different types of dioptor lenses, any one or a combination of which may be utilized in the lens adapter 21 in the position of the dioptor lens 23. The dioptors illustrated in FIG. 4 have focal lengths that are different from each other and from that of the dioptor lens 23. Essentially, the selection of a given dioptor lens enables a desired format for the resulting print to be realized.

Figure 5:
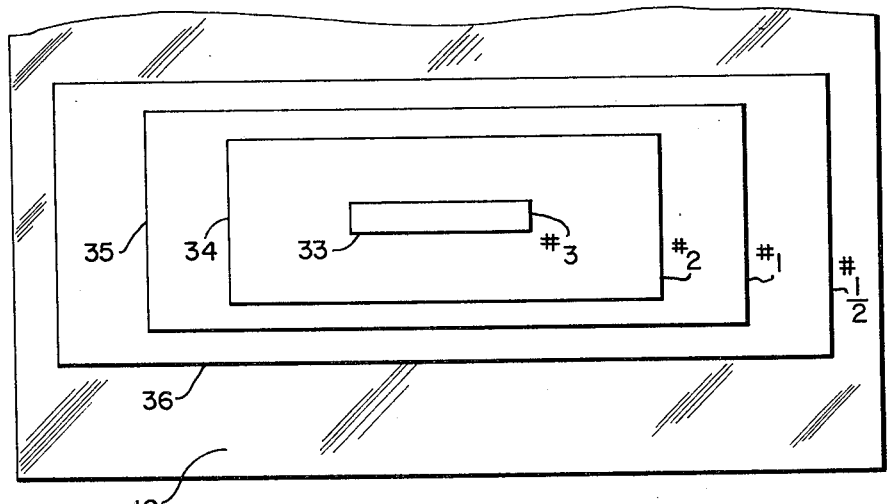

Thus, referring to FIG. 5 there are illustrated in outline, merely by way of example, four different formats which define the size of typical photographic prints which can be made. The smallest is indicated at 33, the next typical size being shown at 34, the next at 35, and the largest size at 36. In order that the image projected by the apparatus of FIG. 1 corresponds substantially to one or the other of the formats illustrated in FIG. 5, a correct dioptor lens from the various dioptors illustrated in FIG. 4 must be chosen. In the particular example set forth, the smallest format 33 can be realized by utilizing a No. 3 dioptor of FIG. 4. The successively larger formats are realized respectively by selecting the dioptor No. 2, No. 1 and No. ½, respectively. The respective formats in FIG. 5 are identified by the dioptor numbers used in FIG. 4.

OPERATION

In operation, when making an anamorphic enlargement, a desired format is first selected. If, for example, format 35 is desired which might typically be 4 × 10½ inches, dioptor No. 1 is positioned in the lens holder 21 at the position of the dioptor 23 shown in FIG. 1. The dioptor functions essentially to size the projected image to approximately that of the selected format. Exact registration of the projected image with the format is accomplished by the first adjusting means in the form of the gear knob 17 which will raise and lower the housing 11 and associated negative film insert device 13, lens holder 19, projection lens 20, lens adapter 21, anamorphic lens 22 and the selected dioptor as a unit towards and away from the work surface 10. This first adjusting means control is locked when proper registration is achieved.

Next, the second adjusting means in the form of the gear knob 28 functions to move only the lens holder 19, projection lens 20, lens adapter 21, anamorphic lens 22 and dioptor 23 as a unit relative to the housing 11 thus varying the distance of the lens system from the negative film insert device 13. Essentially, this second adjustment effects a fine sharp focusing of the image within the format on the work surface 10.

Suitable print paper of the given format is positioned on the work surface 10 and the print paper exposed for a given duration in the usual manner and the print paper then developed. The resulting enlargement is free of any distortion.

An essential feature of this invention is the novel combination of the anamorphic lens 22 and dioptor 23 in front of the lens. This combination permits workable and practical formats to be utilized on the work surface 10 which could not otherwise be achieved in view of the limited range of movement of the first adjusting means on the vertical stand 14. This range is indicated by the double-headed arrow R in FIG. 1.

It will, of course, be understood that formats other than those illustrated in FIG. 5 can be achieved by a suitable selection of projection lenses different from the example of the 150 mm lens shown together with combinations of the dioptors illustrated in FIG. 4. Further, where the negative size is different from 35 mm and thus unsuitable for a 150 mm projection lens, a different focal length lens would be used. For example, for 110 film a 50 or 80 mm lens would be applicable while for a 2¼ × 2¼ negative a 180 or 210 mm lens would suffice.

Essentially, the anamorphic lens/dioptor combination enables a print to be made which is free of distortion and wherein the negative film anamorphic image could heretofore only be viewed by projection thereof on a large screen through an unsqueezing anamorphic lens.

The present invention has thus for the first time made it feasible and practical for average photographers to take advantage of the anamorphic system wherein a substantially greater scene can be accommodated on a given sized negative and the same printed on print paper to provide enlargements of convenient size.

What is claimed is:

1. A method of making anamorphic enlargements from a negative film containing an image squeezed in one dimension resulting from photographing a scene through a given anamorphic lens, comprising the steps of:
   a. projecting the image of the negative film towards a flat surface through a given projection lens;
   b. positioning an anamorphic lens corresponding to said given anamorphic lens between the projection lens and said surface to unsqueeze said image;
   c. positioning a given dioptor lens between said anamorphic lens and said surface to provide a projected picture size on said surface corresponding to a given format;
   d. moving the negative film, projection lens, anamorphic lens and dioptor lens as a unit towards and away from said surface to effect exact registration of said projected picture size and said given format;
   e. moving said projection lens, anamorphic lens and dioptor lens only as a unit relative to said negative film to effect a fine focusing of said image on said format;
   f. exposing print paper of said given format to said image on said surface; and,
   g. developing said print paper to provide said enlargement.

2. The method of claim 1, including the steps of making available a plurality of dioptor lens having focal lengths different from each other and from that of said given dioptor lens so that a plurality of formats of size different from each other and from said given format are available for selection by proper selection of one or a combination of said plurality of dioptor lens.

3. An anamorphic enlarging system comprising, in combination:
 a. a table defining a flat working surface for receiving printing paper upon which an anamorphic negative film image is to be projected;
 b. a projection housing including a light source and supporting a negative film insert device;
 c. a first adjustable means supporting said housing in a position above said working surface so that the distance of the negative film insert device from the working surface may be varied;
 d. a projection lens holder;
 e. a projection lens receivable in said holder;
 f. a lens adapter secured to said projection lens holder;
 g. an anamorphic lens receivable in said lens adapter in a position between said projection lens and said working surface;
 h. dioptor lens means receivable in said lens adapter between said anamorphic lens and said working surface;
 i. a light bellows connected between said projection lens holder and said housing; and
 j. a second adjustable means supporting said projection lens holder to said housing in a position between said negative film insert device and said working surface such that said projection lens holder, projection lens, lens adapter, anamorphic lens and dioptor lens means may be moved as a unit towards and away from said negative film insert device, whereby the size of a projected anamorphic film negative image on said working surface may be varied to fit a selected format by operating said first adjusting means and said projected image then brought into exact focus by operating said second adjusting means.

* * * * *